United States Patent
Wilder

(10) Patent No.: US 9,429,099 B2
(45) Date of Patent: Aug. 30, 2016

(54) PISTON ASSEMBLY WITH MULTI-PIECE SKIRT

(71) Applicant: Montgomery L. Wilder, Morrristown, TN (US)

(72) Inventor: Montgomery L. Wilder, Morrristown, TN (US)

(73) Assignee: Mahle International GmbH (DE)

( * ) Notice: Subject to any disclaimer, the term of this patent is extended or adjusted under 35 U.S.C. 154(b) by 297 days.

(21) Appl. No.: 13/676,719

(22) Filed: Nov. 14, 2012

(65) Prior Publication Data
US 2014/0345454 A1 Nov. 27, 2014

Related U.S. Application Data

(60) Provisional application No. 61/559,302, filed on Nov. 14, 2011.

(51) Int. Cl.
| | |
|---|---|
| *F02F 3/22* | (2006.01) |
| *F02F 3/00* | (2006.01) |
| *F16J 1/08* | (2006.01) |
| *F16J 1/00* | (2006.01) |
| *F02F 3/10* | (2006.01) |
| *F02F 3/18* | (2006.01) |
| *B23P 15/10* | (2006.01) |

(52) U.S. Cl.
CPC ............... *F02F 3/22* (2013.01); *F02F 3/003* (2013.01); *F02F 3/0015* (2013.01); *F02F 3/105* (2013.01); *F02F 3/18* (2013.01); *F16J 1/006* (2013.01); *F16J 1/08* (2013.01); *B23P 15/10* (2013.01); *F02F 2200/00* (2013.01); *Y10T 29/49252* (2015.01)

(58) Field of Classification Search
CPC .............. F16J 1/08; F16J 1/005; F16J 1/006; F02F 3/16; F02F 3/18; F02F 3/20; F02F 3/22; F02F 3/105; F02F 3/042; F02F 3/022; F02F 3/003; F02F 3/0015; F02F 2200/00; B23P 15/10; Y10T 29/49252
See application file for complete search history.

(56) References Cited

U.S. PATENT DOCUMENTS

| | | | |
|---|---|---|---|
| 3,391,613 A | * | 7/1968 | Hocke .............................. 92/228 |
| 5,778,533 A | | 7/1998 | Kemnitz |

(Continued)

FOREIGN PATENT DOCUMENTS

| | | |
|---|---|---|
| DE | 1031051 B | 5/1958 |
| WO | WO-92/10659 A1 | 6/1992 |
| WO | WO-2011101141 A1 | 8/2011 |

OTHER PUBLICATIONS

International Search Report, PCT/US2012/065047, dated Feb. 27, 2013.

*Primary Examiner* — Nathaniel Wiehe
*Assistant Examiner* — Logan Kraft
(74) *Attorney, Agent, or Firm* — Fishman Stewart PLLC

(57) ABSTRACT

A piston assembly and method of making the same are disclosed. An exemplary piston assembly may include a multi-piece skirt secured to a piston crown having a ring belt portion defining a cooling gallery. The crown may include one or more a struts extending away from the ring belt portion to define a wrist pin bore(s). The piston skirt assembly may include two separate portions that each have at least one skirt support securing the respective skirt portion to the strut. A cover plate may be provided that is secured between a radially inner surface of the ring belt portion of the crown and a radially outer surface of the strut, such that the cover plate defines in part the cooling gallery.

16 Claims, 7 Drawing Sheets

(56) References Cited

U.S. PATENT DOCUMENTS

| | | | |
|---|---|---|---|
| 5,884,600 A * | 3/1999 | Wang et al. | 123/193.6 |
| 6,499,387 B2 | 12/2002 | Bedwell | |
| 6,557,514 B1 * | 5/2003 | Gaiser | 123/193.6 |
| 7,162,990 B1 * | 1/2007 | Ioja et al. | 123/193.6 |
| 8,776,670 B2 * | 7/2014 | Lapp et al. | 92/186 |

* cited by examiner

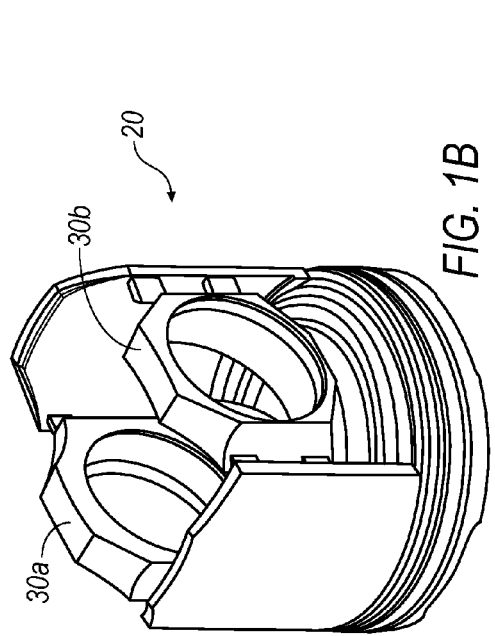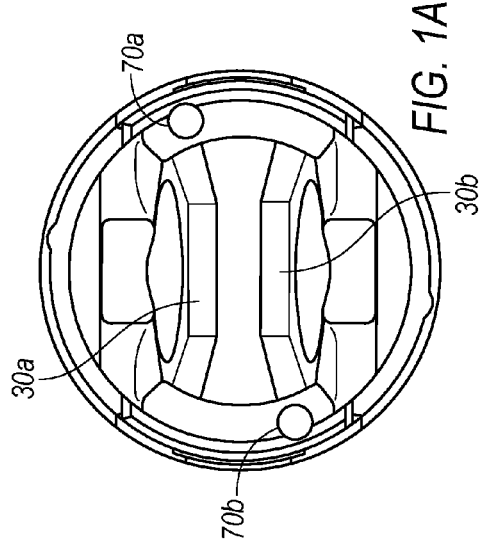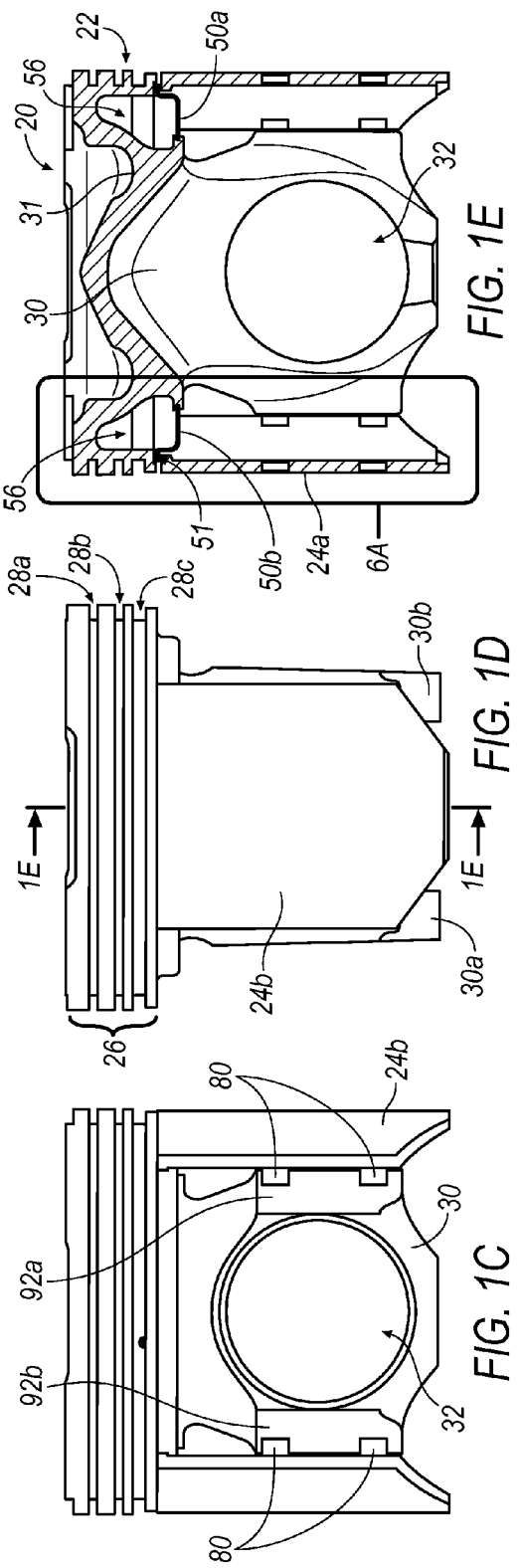

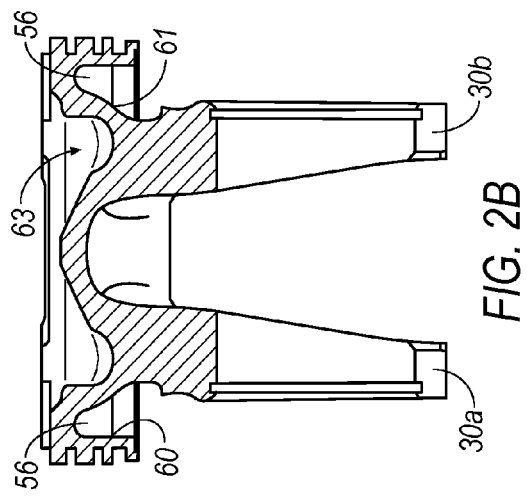
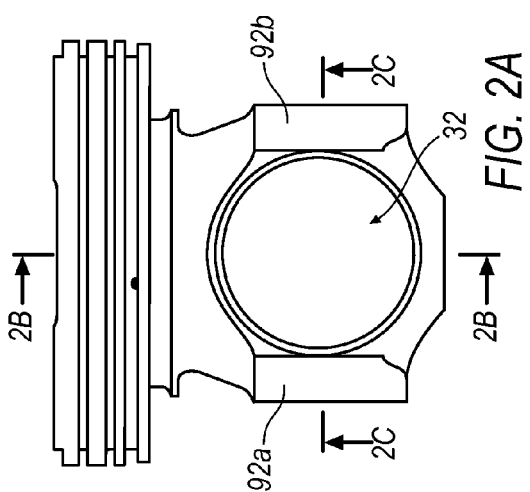
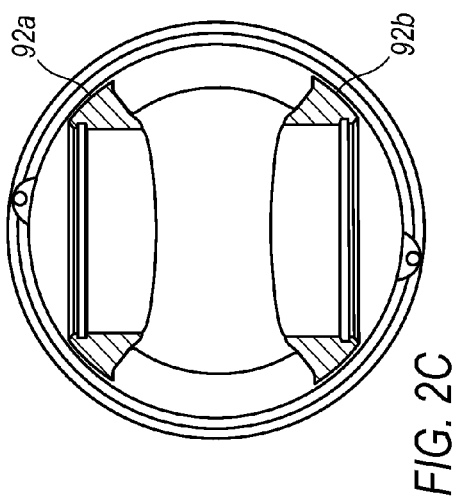

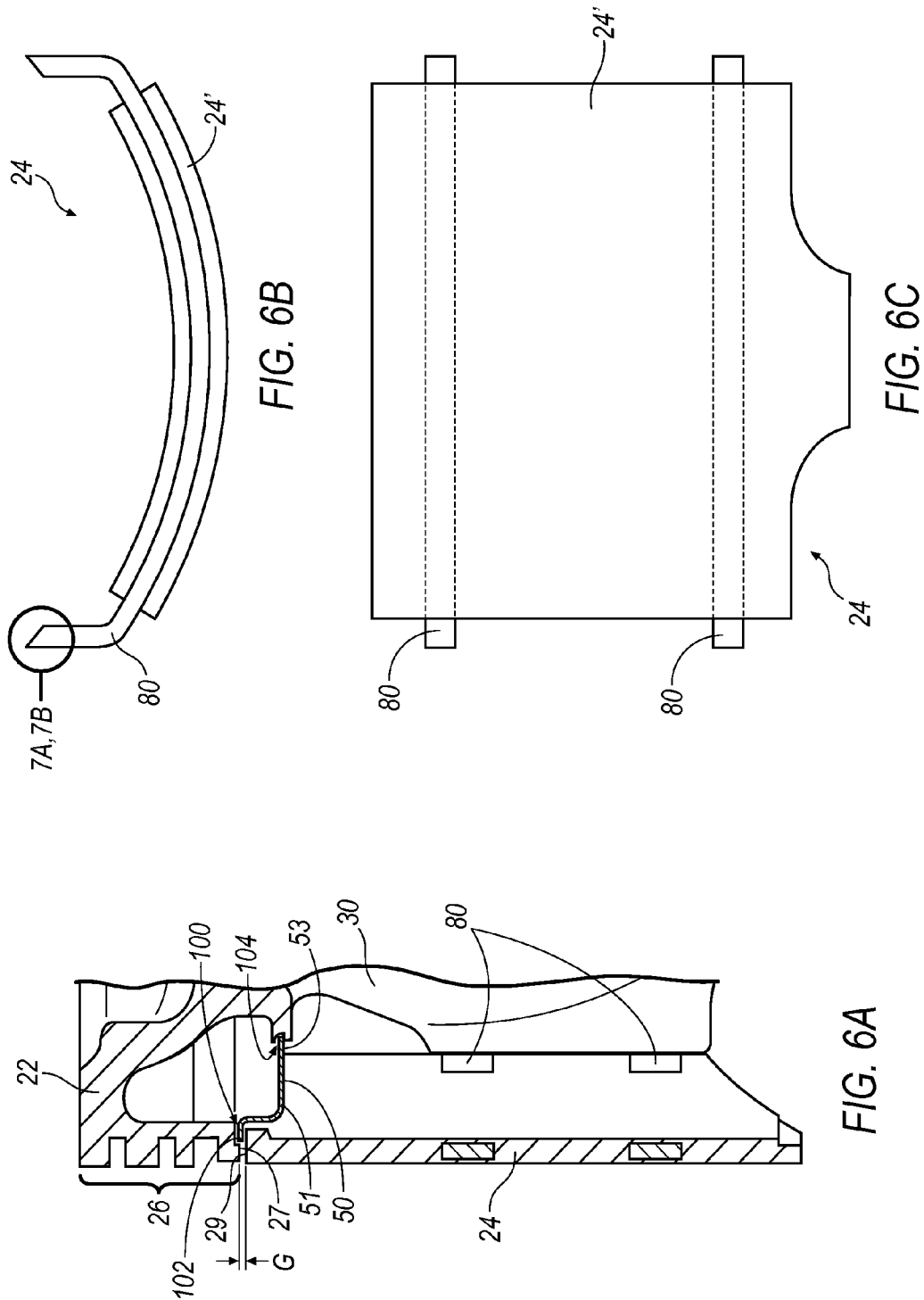

PISTON ASSEMBLY WITH MULTI-PIECE SKIRT

CROSS-REFERENCE TO RELATED APPLICATIONS

This Application hereby expressly incorporates by reference U.S. Provisional Patent Application Ser. No. 61/559,302, filed on Nov. 14, 2011, the contents of which are hereby expressly incorporated by reference in its entirety.

BACKGROUND

Internal combustion engine manufacturers are constantly seeking to increase power output and fuel efficiency of their products. One method of generally increasing efficiency and power is to reduce the oscillating mass of an engine, e.g., of the pistons, connecting rods, and other moving parts of the engine. Engine power may also be increased by raising the compression ratio of the engine. Raising the compression ratio of an engine also generally raises the pressure and temperature within the combustion chamber during operation.

Engines, and in particular the pistons, are therefore under increased stress as a result of these reductions in weight and increased pressures and temperatures associated with engine operation. Piston cooling is therefore increasingly important for withstanding the increased stress of such operational conditions over the life of the engine.

To reduce the operating temperatures of piston components, a cooling gallery may be provided about a perimeter of the piston. Crankcase oil may be introduced to the cooling gallery, and may be distributed about the cooling gallery by the reciprocating motion of the piston, thereby reducing the operating temperature of the piston.

At the same time, the cooling galleries may increase the size and overall complexity of the piston assembly. For example, cooling galleries may require additional parts, such as cooling gallery covers, in order to encourage proper circulation of a coolant throughout the cooling gallery. Some piston designs may also employ a cover plate fitted to the piston crown that generally traps oil within the cooling gallery, thereby increasing the cooling effect of the gallery.

Accordingly, there is a need for a piston that minimizes overall piston weight and complexity, while also allowing adequate cooling, such as by providing a cooling gallery.

BRIEF DESCRIPTION OF THE DRAWINGS

While the claims are not limited to the illustrated examples, an appreciation of various aspects is best gained through a discussion of various examples thereof. Referring now to the drawings, exemplary illustrations are shown in detail. Although the drawings represent the exemplary illustrations, the drawings are not necessarily to scale and certain features may be exaggerated to better illustrate and explain an innovative aspect of an example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

FIG. 1A is a bottom view of an exemplary piston assembly;

FIG. 1B is a perspective view of an exemplary piston assembly, illustrated in an upside-down orientation;

FIG. 1C is a lateral view of an exemplary piston assembly;

FIG. 1D is a lateral view of an exemplary piston assembly, with the piston assembly rotated ninety (90) degrees with respect to the orientation shown in FIG. 1C;

FIG. 1E is a sectional view of an exemplary piston assembly;

FIG. 2A is a lateral view of an exemplary one-piece crown/strut;

FIG. 2B is a partial section view of the exemplary one-piece crown/strut shown in FIG. 2A, taken along lines 2B-2B in FIG. 2A;

FIG. 2C is a partial section view of the exemplary one-piece crown/strut shown in FIG. 2A, taken along lines 2C-2C in FIG. 2A;

FIG. 6A illustrates an enlarged section view of the exemplary piston assembly of FIG. 1E;

FIG. 6B illustrates a top view of an exemplary skirt assembly;

FIG. 6C illustrates a lateral view of an exemplary skirt assembly;

DETAILED DESCRIPTION

Figure 3C:
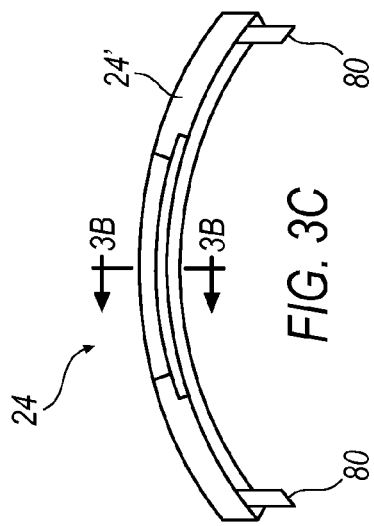
FIG. 3C is a top view of an exemplary skirt assembly.
Figure 3B:
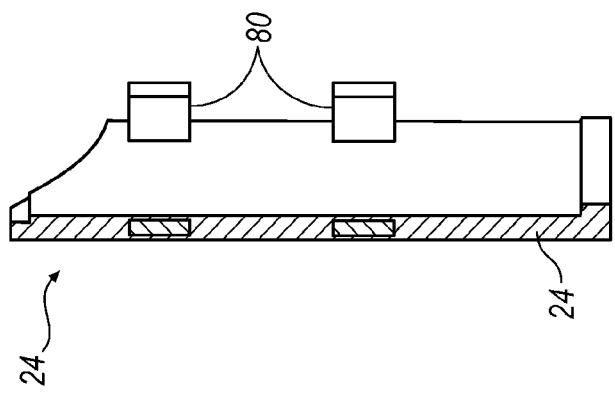
FIG. 3B is a partial section view of an exemplary skirt assembly, taken along lines 3B-3B of FIG. 3C.
Figure 3A:
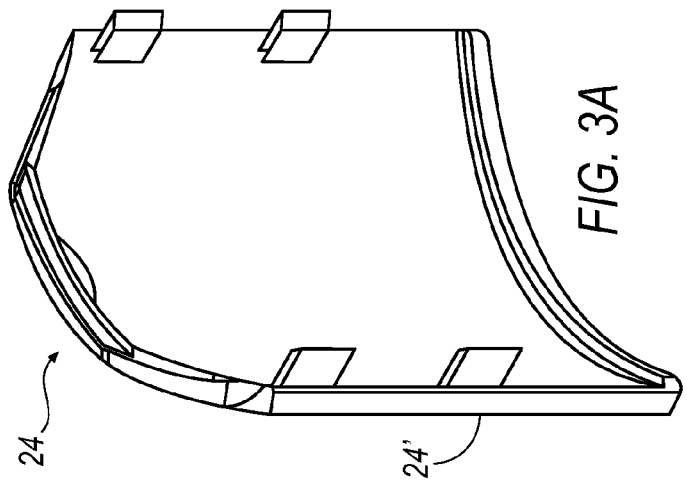
FIG. 3A is a perspective view of an exemplary skirt assembly.
Figure 4A:
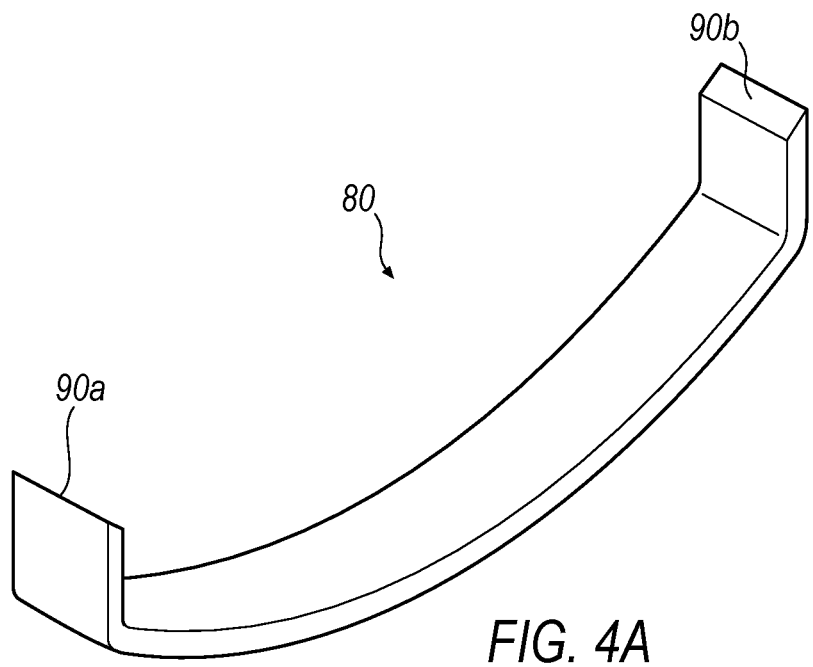
FIG. 4A is a perspective view of an exemplary skirt support.
Figure 4B:
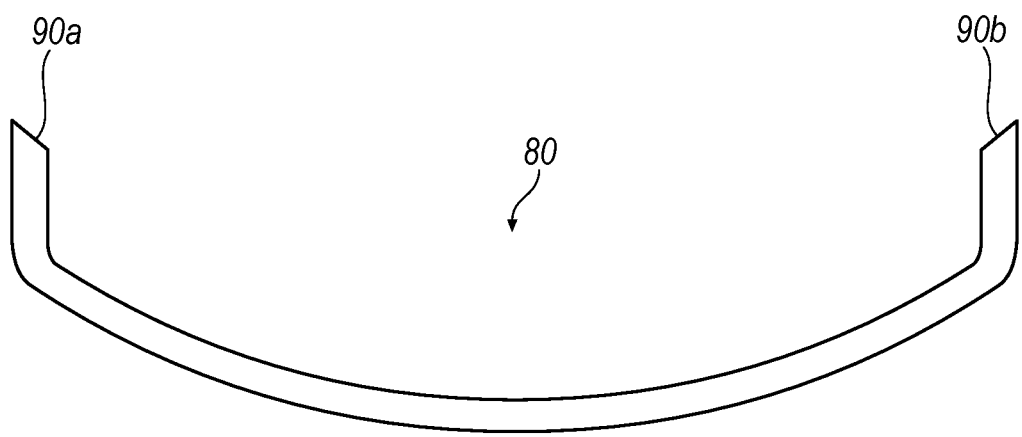
FIG. 4B is a top view of an exemplary skirt support.

Exemplary illustrations of a piston assembly having a multi-piece skirt and a method of making the same are described herein and shown in the attached drawings. Exemplary piston assemblies may include a piston crown having a ring belt portion defining a cooling gallery, and a strut extending away from the ring belt portion to define a wrist pin bore. The piston may further include a piston skirt assembly secured to the strut. The piston skirt assembly may include two separate portions that each have at least one skirt support securing the respective skirt portion to the strut. In some exemplary approaches, a cover plate may be provided that is secured between a radially inner surface of the ring belt portion of the crown and a radially outer surface of the strut, such that the cover plate defines in part the cooling gallery. Moreover, as described further below, the crown and skirt may each be formed of different materials and/or formed in different types of forming processes.

Turning now to the drawings and in particular to FIGS. 1A-1E and 2A-2C, an exemplary piston 20 for an internal combustion engine is disclosed. In the illustration of FIGS. 1A-1E, a piston crown 22 is fixedly joined to a piston skirt 24. The piston crown 22 includes a ring belt portion 26 and a combustion bowl 31. The ring belt portion 26 includes a plurality of ring grooves 28a, 28b, and 28c (collectively, 28) for receiving piston rings (not shown) at least partially therein. In particular, the ring belt portion 26 may include a first ring groove 28a, a second ring groove 28b and a third ring groove 28c. The third ring groove 28c may have an oil control ring (not shown) disposed therein.

The piston crown 22 includes a pair of piston pin bosses or struts 30a, 30b (collectively, 30) that extends away from the ring belt portion 26. The piston pin boss/strut 30 defines a wrist pin bore 32 for receiving a wrist pin (not shown) to affix piston 20 to a connecting rod (not shown). The strut 30 may be formed integrally with the ring belt portion 26, e.g., in a casting operation or progressive forging operation, as will be described further below.

The crown 22 may also define in part a cooling gallery 56 that generally extends about the perimeter of the crown 22, as will be described further below. The cooling gallery 56 is configured to circulate a coolant, e.g., engine oil, thereby reducing an operating temperature of the piston 20, e.g., during engine operation. Additionally, the circulation of the coolant or oil may maintain a more stable or uniform temperature about the crown 22 and/or skirt 24.

The piston skirt 24 generally supports the crown 22 during engine operation, e.g., by interfacing with surfaces of an engine bore (not shown) to stabilize the piston 20 during reciprocal motion within the bore. For example, the skirt 24 may generally define a circular outer shape about at least a portion of a perimeter of the piston 20 corresponding to the cylindrical engine bore surfaces. The circular skirt surfaces may generally slide along the bore surfaces as the piston 20 moves reciprocally within the bore. In the exemplary illustrations shown in FIGS. 1A-1E and 3A-3C, the skirt 24 includes two separate skirt portions 24a, 24b (collectively, 24). The skirts 24 may each include a skirt outer portion 24' that is configured to interface with an engine bore surface (not shown), e.g., by generally defining a generally circular shape that interfaces with generally cylindrical bore surfaces (not shown) of the engine receiving the piston 20.

The skirts 24 may also generally enclose the cooling gallery 56 with a pair of closure plates 50a, 50b (collectively, 50). As best seen in FIGS. 1E and 6A, in one exemplary illustration a radially outer portion 51 of the closure plates 50 is retained by the skirt 24. The closure plates 50a, 50b may generally define a lower limit of the cooling gallery 56. The cooling gallery 56 is located within the piston 20, e.g., within the ring belt portion 26 of the crown 22, and is generally defined at least in part by surfaces of the crown 22, e.g., an annular ring belt wall 60 and a combustion bowl wall 61 defined by an underside of the combustion bowl 63, as best seen in FIGS. 1E and 2B. Accordingly, the cooling gallery 56 is generally bounded by the closure plate 50, the combustion bowl wall 61 and the annular ring belt wall 60. The cooling gallery 56 may also include one or more fluid inlet and/or outlet apertures 70a, 70b for allowing coolant to enter and exit the cooling gallery 56, respectively.

Figure 5A:
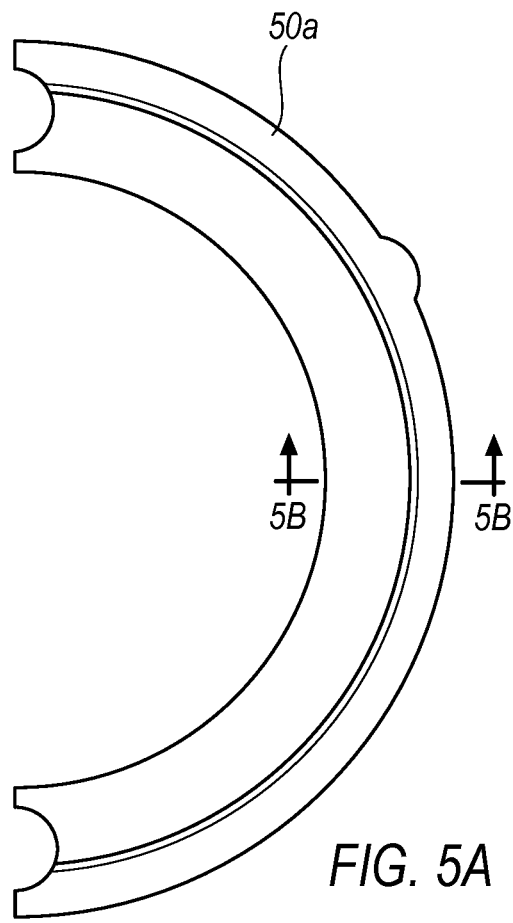
FIG. 5A is a top view of an exemplary cooling gallery cover plate.
Figure 5B:
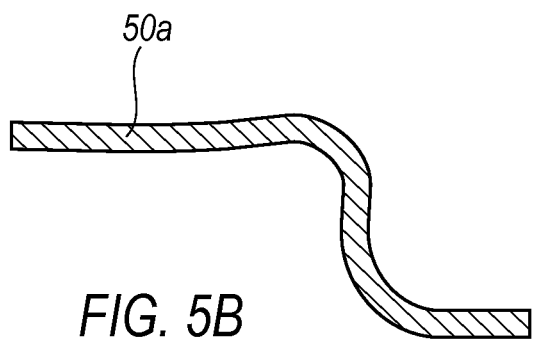
FIG. 5B is a section view of the exemplary cooling gallery cover plate of FIG. 5A, taken through line 5B-5B.

An exemplary closure plate 50a is illustrated in more detail in FIGS. 5A and 5B. The closure plates 50a, 50b may be formed in any process that is convenient. Merely as one example, the closure plates may be formed in a progressive stamping or forging process.

In examples where the skirt 24 is provided in two separate portions 24a, 24b that are disposed on opposing sides of the strut 30 and/or wrist pin bore 32, each skirt portion 24a, 24b may be secured separately to the crown 22. For example, each skirt portion 24a, 24b may be secured along the strut 30 via one or more skirt struts or supports 80.

Exemplary skirt supports 80 are illustrated in further detail in FIGS. 3A-3C, 4A, and 4B. The skirt supports 80 may be formed integrally with the skirts 24. In one exemplary illustration, the supports 80 are cast-in with the skirts 24, as will be described further below. Conveniently, this may allow the use of different materials for the supports 80 than the skirts 24. In one exemplary illustration, the supports 80 are formed of a steel material, e.g., a 4140 steel material, while the skirts 24 are formed of an aluminum material that is cast around the supports 80.

The skirt 24 may be secured or fixedly joined to the crown 22 in any manner that is convenient including, but not limited to, beam welding, laser welding, form-locking, adhesive bonding, or mechanical fastening with one or more bolts, screws, etc. In one exemplary illustration, the skirt supports 80 of each skirt portion 24a, 24b may be secured to the strut 30 along corresponding mating surfaces 90, 92 defined by the skirt portions 24a, 24b and strut 30, respectively. More specifically, in one exemplary approach best seen in FIGS. 4A and 4B, a first one of the skirt supports 80 may define skirt mating surfaces 90a, 90b on either side of the support 80. The skirt mating surface 90a may be welded to a strut mating surface 92a, as best seen in FIGS. 1C, 2A and 2C. Similarly, the skirt mating surface 90b of the skirt support 80 may be welded to a second strut mating surface 92b disposed on the other one of the struts 30, and on an opposite side of the wrist pin bores 32 defined by the struts 30, with respect to the first strut mating surface 92a.

Figure 7A:
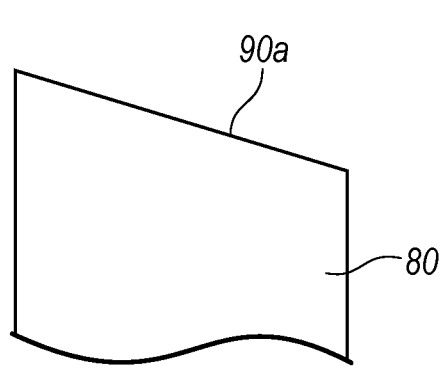
FIG. 7A illustrates an enlarged top view of the exemplary skirt support of FIG. 6B, according to an exemplary illustration.

The mating surfaces 90, 92 may be generally aligned to promote a secure attachment between the skirt assemblies 24 and the struts 30, and may be optimized according to an associated process for joining the mating surfaces 90, 92. As best seen in FIG. 7A, in one exemplary illustration the supports 80 are laser welded to the struts 30 along the mating surfaces 90, 92. In such examples, a mating surface 90a of the support 80 may be generally straight or planar if a corresponding mating surface 92 (not shown in FIG. 7A) of the strut 30 is also generally straight or planar, respectively. The mating surface 90a may be machined, e.g., in a milling operation, to ensure that the mating surface 90a is straight or planar, such that a proper alignment of the mating surface 90a is facilitated with respect to a substantially planar mating surface 92 of the strut 30.

Figure 7B:
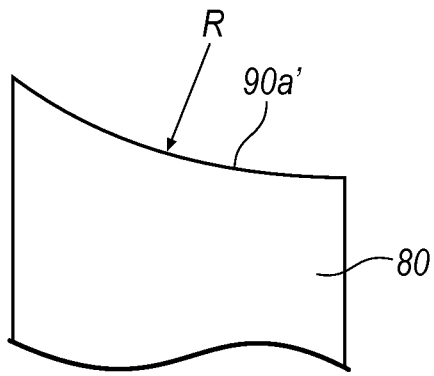
FIG. 7B illustrates an enlarged top view of the exemplary skirt support of FIG. 6B, according to another exemplary illustration.

Alternatively, as best seen in FIG. 7B, a mating surface 90a' of the support 80 may be curved, e.g., to correspond to a similarly curved mating surface 92 (not shown in FIG. 7B). The mating surface 90a' may be machined, e.g., in a turning operation employing a curved grinding element, such that the mating surface 90a' defines a curved surface having a radius R. The mating surface 90a' may thereby be curved with a radius R that generally corresponds or is equal to that defined by an associated mating surface 92 (not shown in FIG. 7B) of a strut 30.

As best seen in FIG. 6A, an upper edge 27 of the skirt 24 may be spaced from a lower edge 29 of the ring belt portion 26 of the crown 22, thereby defining a gap G between the upper edge 27 and lower edge 29. By spacing away the lower edge 29 of the ring belt portion 26 from the upper edge 27 of the skirt 24, such that the lower edge 29 is unsupported with respect to the skirt 24, an ability of the ring belt portion 26 to flex a relatively small distance radially with respect to the piston 20 during operation may be enhanced. This ability of the ring belt portion 26 to flex may, in some cases, reduce friction of the piston 20 against associated bore surfaces.

Alternatively, the skirt 24 may be secured along the upper edge 27 to the lower edge 29 of the crown 22, e.g., by bonding or welding along the upper and lower surfaces 27, 29. In such approaches, no gap G is present between the upper and lower surfaces 27, 29. A permanent joining of the upper edge 27 and lower edge 29, e.g., by bonding or welding, may in some cases improve the radial stiffness of the ring belt portion 26, thereby improving an ability of the ring belt portion 26 to maintain consistent contact with an associated bore surface, and in turn improving a seal between piston rings seated in the grooves 28 and the associated bore surfaces.

In yet another exemplary illustration, the skirt 24 and ring belt portion 26 may fit together in an extension/recess arrangement, i.e., where one of the components defines an extension that is received in a recess of the other component. A register/recess arrangement may provide additional radial stiffness to the skirt 24 and/or ring belt portion 26 relative to bore surfaces adjacent the piston 20. For example, as best seen in FIG. 6A, the ring belt portion 26 and skirt 24 may cooperate to form a retention pocket 100, which receives therein the radially outer portion 51 of the closure plate 50. More specifically, the lower edge 27 of the ring belt portion 26 defines a recess 102 which cooperates with the upper edge 29 of the skirt 24, thereby generally trapping the radially outer portion 51 of the closure plate 50. A radially inner portion 53 of the closure plate 50 may be prevented from radially inward movement with respect to the crown 22 by one or both struts 30, thereby generally retaining the closure plate 50. For example, the radially inner portion 53 of the closure plate 50 may be received in a strut pocket 104 defined by the strut 30.

Accordingly, the upper edge 27 of the skirt 24 and the lower edge 29 of the ring belt portion 26 may be joined or not joined, depending on the need for more or less radial flexibility in a particular intended application of the piston 20. Moreover, the upper edge 27 and lower edge 29 may be joined to varying degrees to adjust a radial stiffness of the ring belt portion 26. For example, the upper edge 27 and lower edge 29 may be joined along a predetermined number of discrete joint locations, e.g., with a laser spot weld or a predetermined discrete amount of bonding agent. Where a greater number of joint locations along the upper edge 27 and lower edge 29 are employed, radial stiffness of the ring belt portion 26 will tend to increase. As such, a desired radial stiffness of the ring belt portion 26 may be more precisely targeted.

As noted above, and as best seen in FIG. 1E and in FIG. 6A, the closure plate 50 may be generally retained between the strut 30, skirt 24, and ring belt portion 26. More specifically, the closure plate may be retained along a radially inner portion or edge 53 of the closure plate 50 by the strut 30. A radially outer portion or edge 51 of the closure plate 50 may be retained by the skirt 24 and/or the ring belt portion 26. As will be described further below, the closure plate 50 may be positioned between the strut 30 and ring belt portion 26 prior to securement of the skirt 24 to the strut 30. For example, after the closure plate 50 is positioned between the strut 30 and ring belt portion 26, the skirt 24 may be secured to the strut 30, thereby enclosing the radially outer portion 51 of the closure plate 50 and generally preventing movement of the closure plate 50 with respect to the strut 30, thereby securing the closure plate 50 within the piston 20.

By fixedly joining the supports 80 of the piston skirt 24 to the piston crown 22, the piston 20 may generally formed as a one-piece or "monobloc" piston assembly. That is, the piston crown 22 is generally unitized with the piston skirt 24, such that the piston skirt 24 is immovable relative to the piston crown 22 after securement to the crown 22.

Piston crown 22 and piston skirt 24 may be constructed from any materials that are convenient. In one exemplary illustration, the crown 22 and skirt 24 are formed of the same material. In another example, the piston crown 22 may be formed of a different material than the piston skirt 24. Accordingly, a material used for the piston crown 22 may include different mechanical properties, e.g., yield point, tensile strength or notch toughness, than the piston skirt 24. Merely as examples, the crown 22 may be formed of a steel material, cast iron, or aluminum material, with the skirt 24 being formed of a cast iron, composite, aluminum, or powdered metal. Any other material or combination may be employed for the crown 22 and skirt 24 that is convenient. The crown 22 and skirt 24 may also be formed in different processes, e.g., the crown 22 may be a generally single forged piece, while the skirt 24 may be cast or stamped. Any material and/or forming combination may be employed that is convenient.

Moreover, as noted above the supports 80 and skirt 24 may be formed of a same material or of different materials. For example, supports 80 may be a steel material that is stamped, while the skirt 24 is an aluminum material that is cast around the supports 80.

Figure 8:
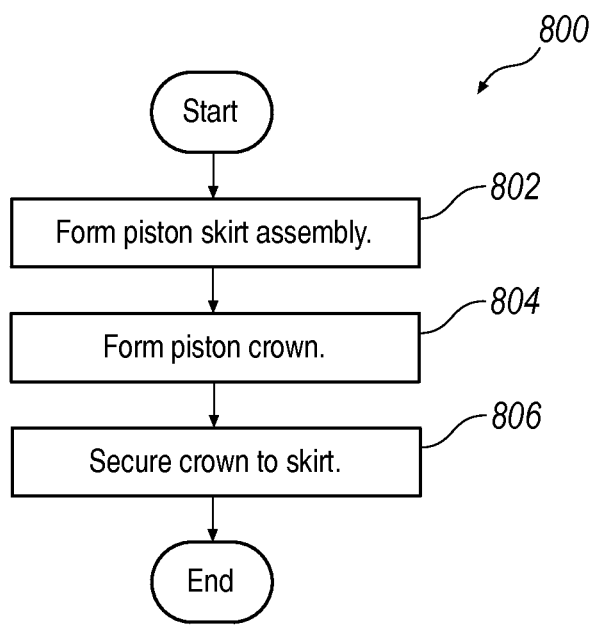
FIG. 8 illustrates a process flow diagram of a method of making a piston assembly, according to one exemplary illustration.

An exemplary process 800 of forming a piston 20 will now be described, with reference to FIG. 8. Initially, at block 802, a skirt assembly such as the above-described skirt 24, which includes the skirt outer portion 24' and at least one support 80, may be formed. For example, one or more skirt supports 80 may initially be provided, which are then cast-in within the skirt outer portion 24'. In one exemplary illustration, two skirt supports 80 are provided in each skirt assembly 24a, 24b, such that there are four separate mounting points defined by the skirt assembly 24, i.e., by each end of the two skirt supports 80. The supports 80 may be pre-heated prior to casting of the skirts 24. The skirt 24/support 80 subassembly may then be heat treated. For example, the skirt assembly 24, including the skirt outer portion 24' and skirt support(s) 80, may be heat treated in a T5 aluminum heat treating process, as may be useful where the skirt 24 is a gravity-cast aluminum material. The mating surfaces 90a, 90b of the supports 80 may then be machined for alignment with an associated mating surfaces 92 of the strut(s) 30. For example, as noted above the mating surfaces 90 may be milled to promote a planar or straight surface that interfaces with a corresponding planar or straight mating surface 92 of the strut 30. Alternatively, the mating surface 90 may be turned to form a radiused or curved surface that aligns with a similarly radiused or curved mating surface 92 of the strut 30.

Proceeding to block 804, the crown 22 may be formed in any process that is convenient. In one exemplary illustration, the crown 22 and strut 30 may be forged, or cast in a single unitary or integral piece, merely as examples. Various features of the crown 22 and strut 30 may also be machined. For example, mating surfaces 92 of the strut 30 may be milled or turned to form a planar or curved surface, respectively, thereby generally matching an associated mating surface 90 of the skirts 24. Moreover, features along the lower edge 27 of the ring belt portion 26 and struts 30 provided for retaining closure plate 50, i.e., recess 102 and/or strut retention pocket 104, may also be machined. Alternatively, the recess 102 and/or strut retention pocket 104 may be formed initially in the crown 22 in an associated process of forming the crown 22, e.g., forging or casting. Process 800 may then proceed to block 806.

At block 806, the skirt 24 may be joined to the crown 22. In one exemplary illustration, the closure plate 50 is positioned between the ring belt portion 26 and strut 30, as described above. The crown 22 may be maintained in an upside-down position to facilitate holding the closure plate 50 temporarily in place, e.g., in slots, grooves, or other features formed in the strut 30 and/or ring belt portion 26. For example, a radially inner portion 53 of the closure plate 50 may initially be positioned against the strut, for example within the strut retention pocket 104. The radially outer portion 51 of the cover plate may then be positioned within a recess 102 of the ring belt portion 26, such that the closure plate 50 rests upon the lower edge 27 of the ring belt portion 26. In this manner, the closure plate 50 generally rests upon the crown 22 at the strut 30 and the ring belt portion 26, but is not permanently secured to the crown 22.

In one exemplary illustration of block 806, after the closure plate 50 is positioned on the crown 22, the skirt 24 may next be secured to the strut 30. For example, the skirt supports 80 may be laser-welded to the strut 30 along the corresponding mating surfaces 90, 92 as described above. The skirt 24 may thereby secure the closure plate 50 permanently to the piston 20, by generally trapping the radially outer edge 51 of the closure plate 50 within the retention pocket 100 which is formed by the skirt 24 and ring belt portion 26.

After the skirts 24 are joined to the struts 30, weld joints between the supports 80 and the struts 30 may be heat treated, e.g., by subjecting the entire piston 20 to an elevated temperature, in order to relieve stresses in the weld joints. The piston 20 may next be finish machined, e.g., to complete forming the wrist pin bore surfaces, combustion bowl surfaces, outside diameter of the crown 22, or any other features of the piston 20 that may be conveniently machined. The piston 20 may also be coated or have other surface treatment applied to the piston, e.g., phosphate coatings or the like.

The exemplary piston 20 offers a number of advantages compared with previously known piston designs. The piston 20 may be relatively lighter than pistons using a fully cast or forged skirt, as size of the skirt 24 may be reduced to a minimum size for interfacing with associated bore surfaces. By comparison, known cast and forged skirts must be relatively larger in order to allow the proper formation of the features needed to join the skirt to the piston crown, e.g., friction welding surfaces about an entire perimeter of the piston, or the like. The supports 80, by contrast, provide relatively small and lightweight extensions that support the minimally sized skirt 24. The piston 20 may also be more cost effective to produce compared to other piston designs, for example as a result of the simplified parts of the multi-piece skirt assembly, including the skirt 24 and supports 80. The enclosure of the closure plate 50 by the skirt 24 and crown 22 also obviates any need for the closure plate to have additional features for securing the closure plate 50 directly to the piston 20, e.g., a spring force, extensions, etc. As noted above, various characteristics of the piston 20 may be optimized for a given application, e.g., by adjusting a radial stiffness of the ring belt portion 26 depending on whether and to what degree the skirt 24 and ring belt portion 26 may be joined to one another. Finally, the multitude of materials and associated forming processes allows customization of each of the components, including the skirt 24, crown 22, closure plate 50, and supports 80, for its intended purpose in the overall piston 20.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A piston assembly, comprising:
   a piston crown, including:
      a ring belt portion defining at least in part a cooling gallery; and
      a strut extending away from the ring belt portion to define a wrist pin bore;
   a piston skirt assembly permanently secured to the strut to define a fixed position with respect to the strut, the piston skirt assembly including two skirt portions, each of the skirt portions having at least one skirt support securing the respective skirt portions to the strut; and
   a cover plate separately formed from the crown and skirt, the cover plate retained at a radially outer portion by a radially inner surface of the ring belt portion, the cover plate retained at a radially inner portion by a radially outer surface of the strut such that the cover plate is permanently fixed in place relative to the crown and skirt, the cover plate defining in part the cooling gallery;
   wherein the piston skirt assembly includes a skirt outer portion configured to interface with an engine bore, and
   wherein the at least one skirt support includes at least two skirt supports, the skirt outer portion formed around the skirt supports such that the skirt supports each extend through the skirt outer portion.

2. The piston of claim 1, wherein the cover plate is retained at a radially outer portion by the piston skirt assembly.

3. The piston of claim 2, wherein the piston skirt assembly cooperates with the ring belt portion to define a cover plate retention pocket, the cover plate retention pocket receiving the radially outer portion of the cover plate.

4. The piston of claim 1, wherein the skirt supports are welded to the strut.

5. The piston of claim 1, wherein the crown and skirt are formed of different materials.

6. The piston of claim 1, wherein the skirt outer portion is formed of a first material and the skirt support is formed of a second material different from the first material.

7. The piston of claim 1, wherein a first one of the skirt supports secures the skirt outer portion to a first piston pin boss of the crown, and a second one of the skirt supports secures the skirt outer portion to a second piston pin boss of the crown.

8. A method of assembling a piston, comprising:
providing a piston crown having a ring belt portion defining a cooling gallery and a strut extending away from the ring belt portion to define a wrist pin bore;
forming a piston skirt assembly, including two skirt portions, each skirt portion having at least one skirt support;
permanently securing the skirt supports to the strut such that the skirt assembly defines a fixed position with respect to the strut;
permanently fixing in place a cover plate relative to the crown and skirt, including retaining a radially outer portion of the cover plate with a radially inner surface of the ring belt portion, and retaining a radially inner portion of the cover plate with a radially outer surface of the strut, the cover plate separately formed from the crown and skirt, the cover plate defining in part the cooling gallery;
establishing the piston skirt assembly as including a skirt outer portion configured to interface with an engine bore;
establishing the skirt outer portion as being formed of a first material;
establishing the skirt support as being formed of a second material different from the first material;
forming the skirt outer portion around the skirt supports such that the skirt supports each extend through the skirt outer portion; and
establishing first material of the skirt outer portion as retaining, at least in part, the radially outer portion of the cover plate.

9. The method of claim 8, further comprising retaining the cover plate between the piston skirt assembly and the piston crown at a radially outer portion of the cover plate.

10. The method of claim 9, further comprising forming a cover plate retention pocket between the piston skirt assembly and the ring belt portion, the cover plate retention pocket receiving the radially outer portion of the cover plate.

11. The method of claim 8, further comprising establishing the crown and skirt as being formed of different materials.

12. The method of claim 8, wherein securing the skirt supports to the strut includes welding at least one of the skirt supports to the strut.

13. The method of claim 8, further comprising establishing the piston skirt assembly as including the skirt outer portion configured to interface with an engine bore.

14. The method of claim 13, further comprising establishing the at least one skirt support as including at least two skirt supports, the skirt supports disposed on opposing sides of the skirt outer portion such that a first one of the skirt supports secures the skirt outer portion to a first piston pin boss of the crown, and a second one of the skirt supports secures the skirt outer portion to a second piston pin boss of the crown.

15. The method of claim 8, further comprising establishing the at least one skirt support as including at least two skirt supports.

16. The method of claim 8, wherein forming the skirt outer portion around the skirt supports includes casting the skirt outer portion around the skirt supports.

\* \* \* \* \*